May 17, 1960 D. D. DOERR ET AL 2,936,985
PALLET HAVING SWINGABLE LOADING AND UNLOADING RAMPS
Filed Dec. 9, 1955 5 Sheets-Sheet 1
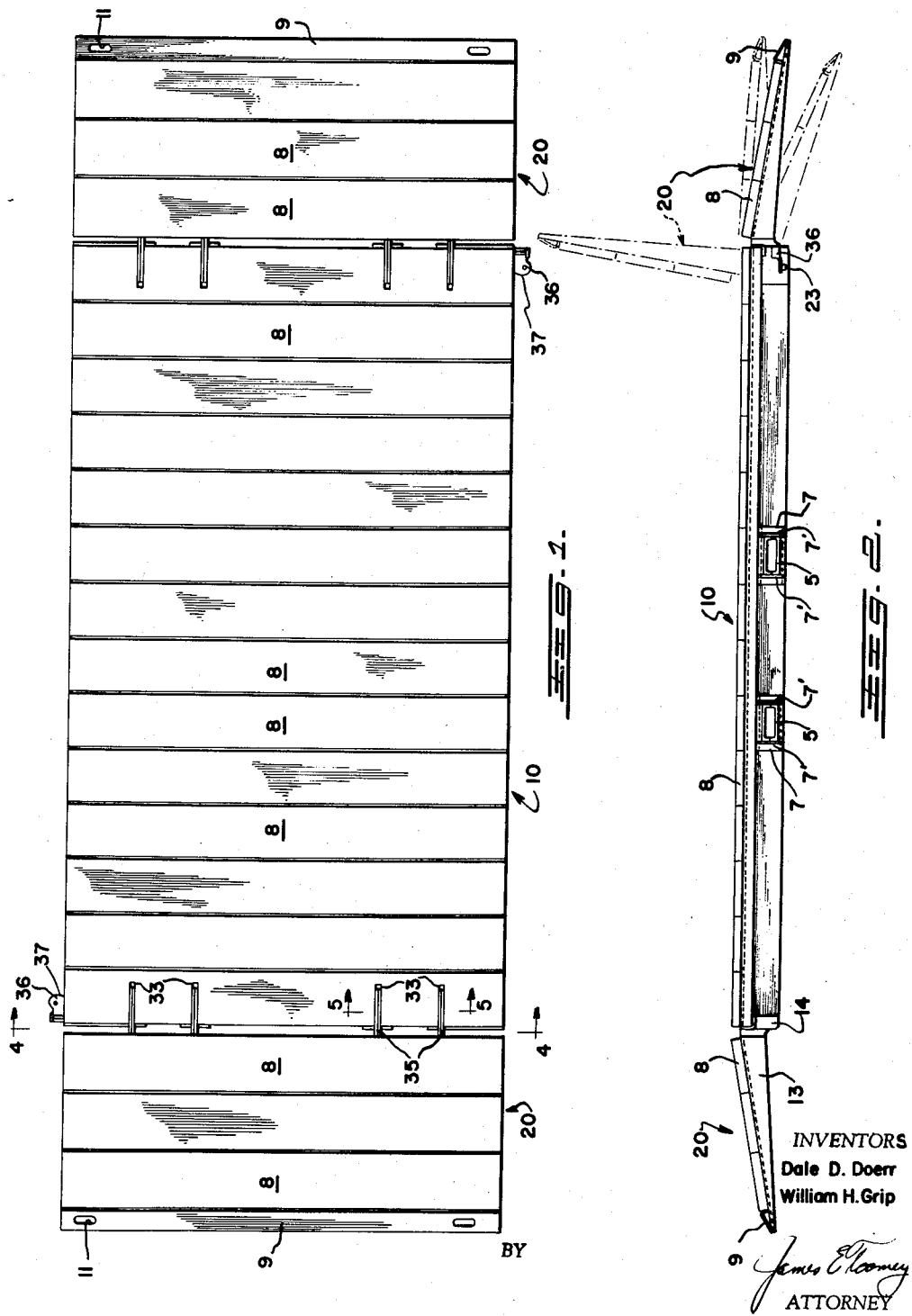
INVENTORS
Dale D. Doerr
William H. Grip
ATTORNEY

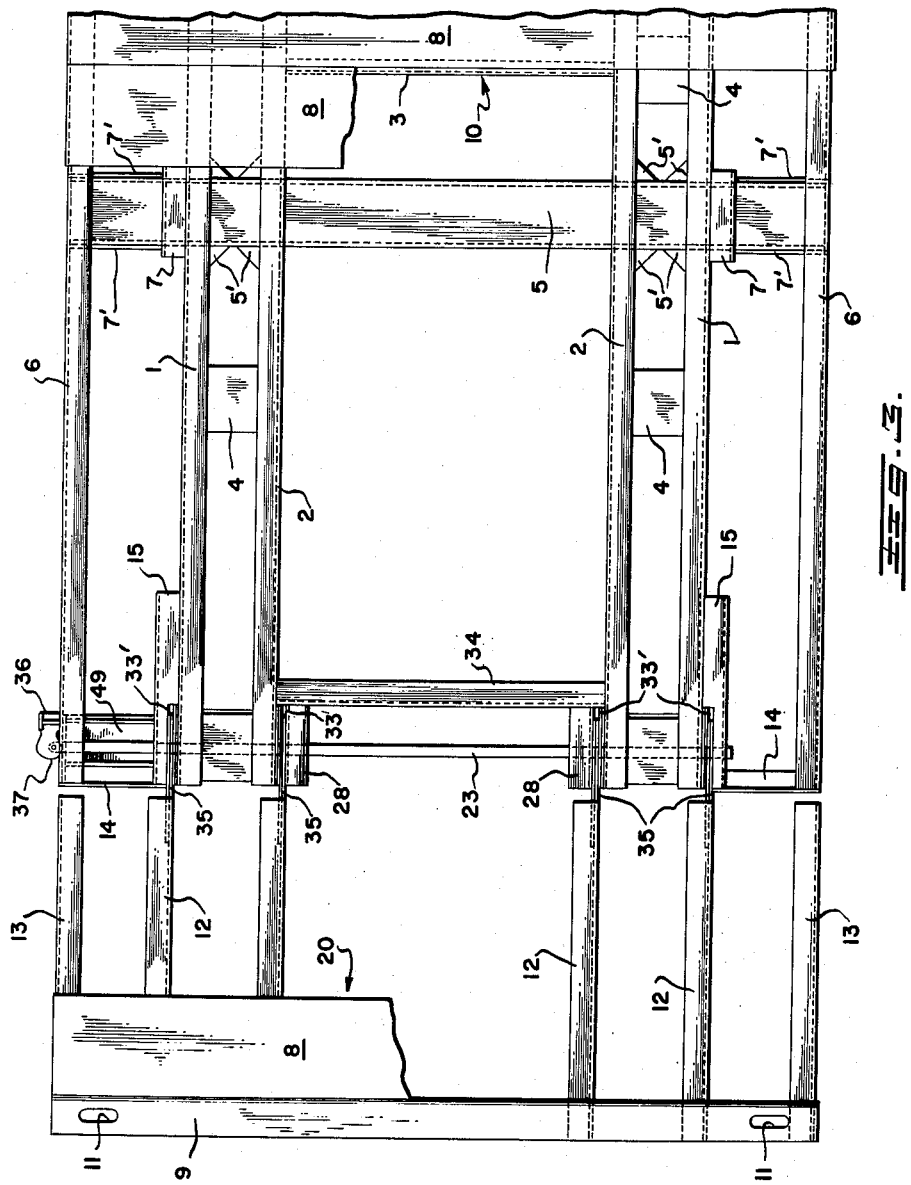

May 17, 1960
D. D. DOERR ET AL
2,936,985
PALLET HAVING SWINGABLE LOADING AND UNLOADING RAMPS
Filed Dec. 9, 1955
5 Sheets-Sheet 3
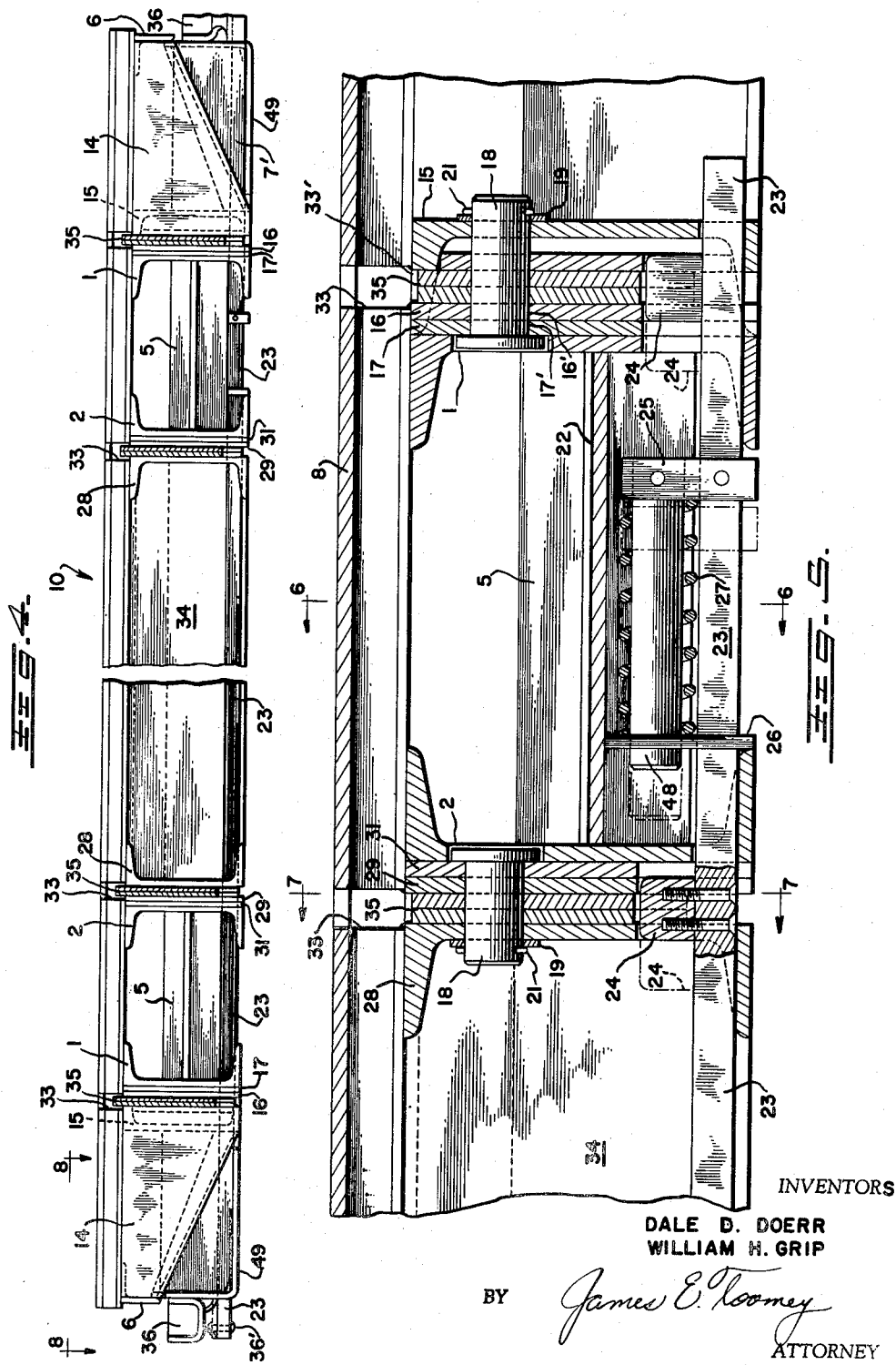
INVENTORS
DALE D. DOERR
WILLIAM H. GRIP
BY James E. Toomey
ATTORNEY

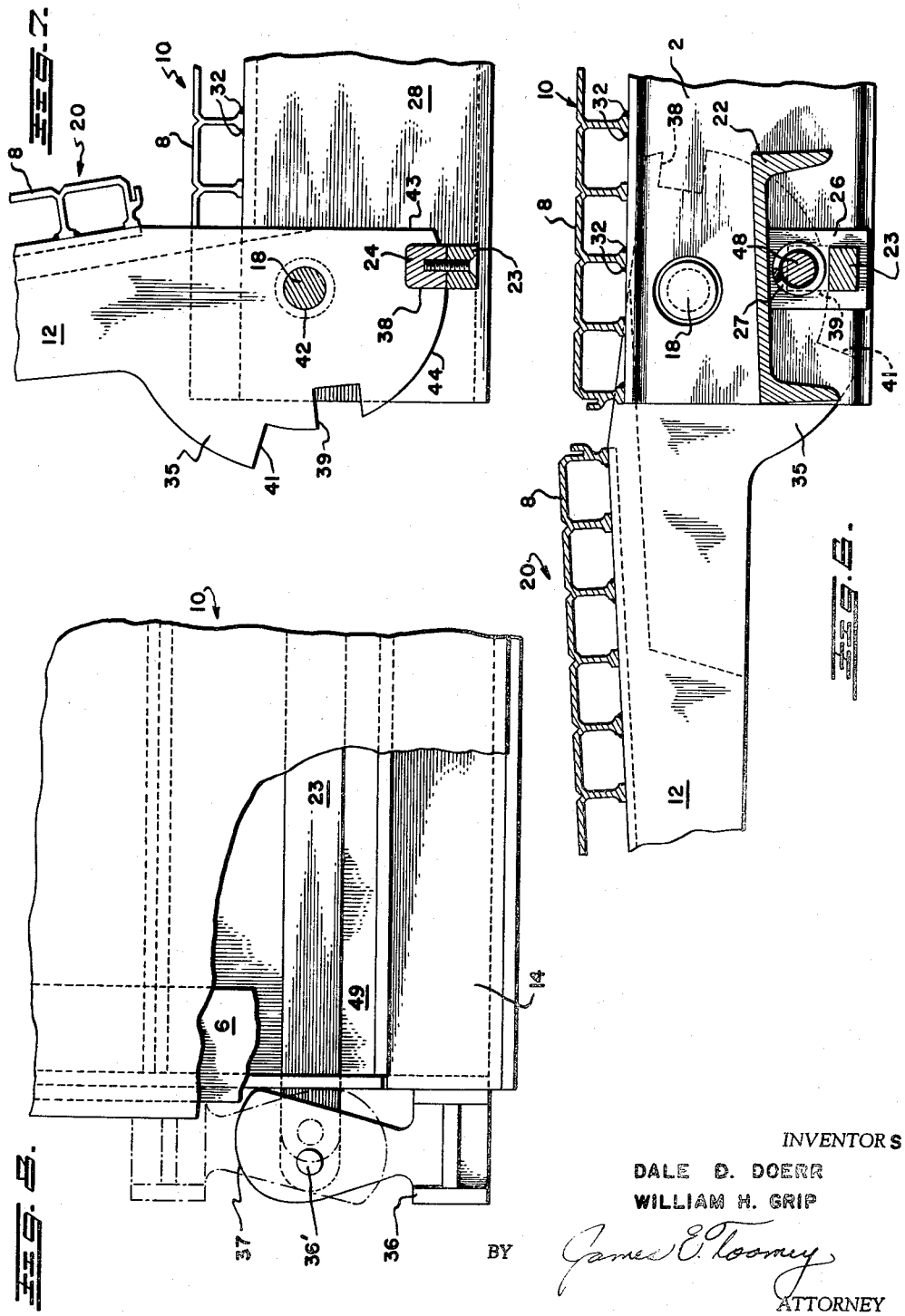

May 17, 1960 D. D. DOERR ET AL 2,936,985
PALLET HAVING SWINGABLE LOADING AND UNLOADING RAMPS
Filed Dec. 9, 1955 5 Sheets-Sheet 5
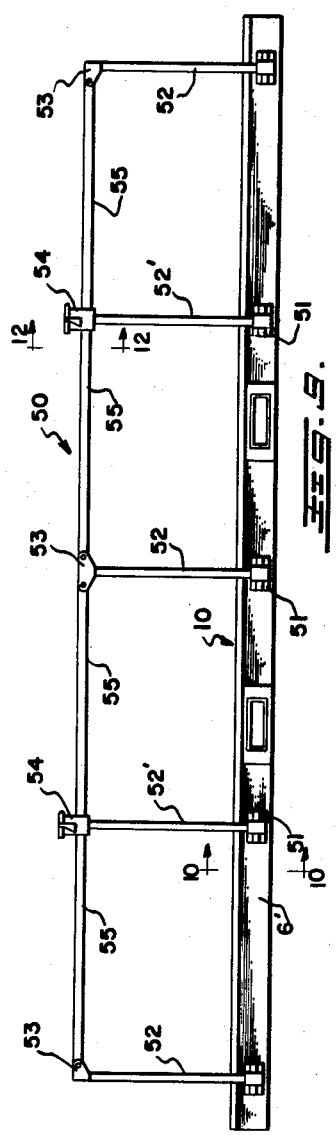
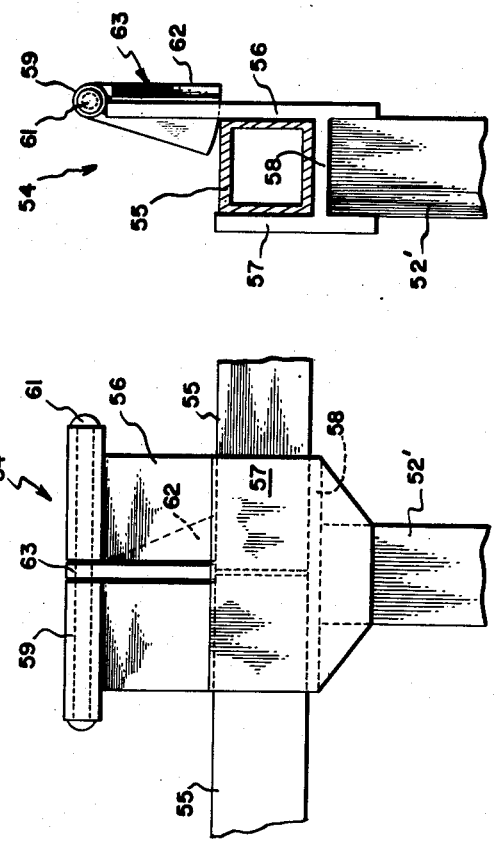
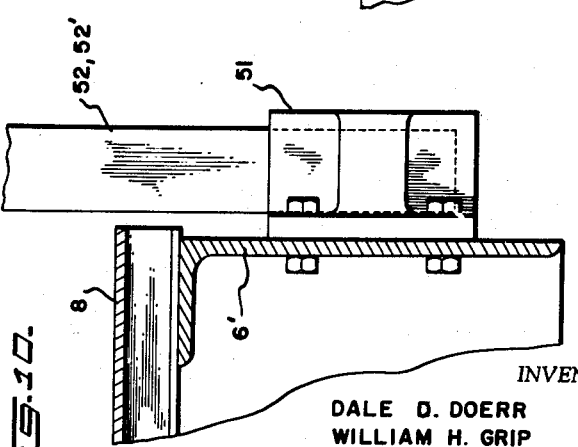
INVENTORS
DALE D. DOERR
WILLIAM H. GRIP
BY James E. Roomey
ATTORNEY

United States Patent Office 2,936,985
Patented May 17, 1960

2,936,985

PALLET HAVING SWINGABLE LOADING AND UNLOADING RAMPS

Dale D. Doerr, Palos Park, and William H. Grip, Chicago, Ill., assignors to Kaiser Aluminum & Chemical Corporation, Oakland, Calif., a corporation of Delaware Application December 9, 1955, Serial No. 552,011

5 Claims. (Cl. 248—120)

This invention relates to cargo carrying pallets. More particularly this invention relates to generally flat cargo supporting platforms or pallets which are specifically constructed for use with conventional front and side load lifting vehicles. Such vehicles find extensive use throughout all branches of industry and the transportation fields and are commonly designated as "fork lift" trucks.

In handling bulky articles of cargo such as heavy boxes, machine parts, aircraft and auto engines, it has become common practice to provide pallets or platforms upon which the cargo may be stacked or carried. These pallets may be used for storage of the articles pending future use. They are also constructed in such a manner as to facilitate handling of great quantities or heavy individual pieces of cargo by the use of lift trucks which may pick up the entire palletized load and move and maneuver it, in toto, from place to place as well as load and unload vehicles such as planes, trucks, railroad cars and the like. Tremendous savings in time, money and manpower are thus effected.

It is with such pallets or platforms that the instant invention deals. More specifically the invention is concerned with a novel pallet construction whereby the loading and unloading of the pallet or platform is greatly facilitated and wherein either a side lift or front lift truck can be utilized with equal facility for handling the pallet.

Accordingly, it is an object of the present invention to produce a novel cargo conveying and handling pallet having a large load carrying capacity.

Another object of the instant invention is to provide a novel load carrying pallet which can be handled by a fork lift truck, the pallet being so constructed as to greatly facilitate the handling, loading and unloading of extremely heavy bulky loads such as jet engines, large boxes and the like.

A further object of the invention is to provide a novel cargo carrying pallet having means including detachable side rails for stabilizing the cargo to prevent accidental dropping and resultant damage.

Still a further object of the invention is to produce a novel pallet, which can be used with equal facility with either front or side lifting fork lift type vehicles.

An additional object of the invention is to provide a novel pallet for bulky cargo which may be loaded and unloaded with greater facility than those devices now used.

A further object of the invention is to provide a cargo pallet of exceptionally rugged construction which may be moved longitudinally of its length and which is capable of withstanding the normal abuse to which such devices are daily subjected.

These and other objects, all readily apparent, of the instant invention may be accomplished by the construction of a generally rectangular pallet having both side and end means for receiving the prongs of a fork lift truck and further including vertically swingable multi-positionable aprons or ramps either one of which may be selectively locked in any one of several positions. The pallet may further include a removable cargo confining railing having multpile access entrances to permit loading and unloading of the loads.

Considering now the specific construction disclosed, attention is directed to the accompanying drawings and the detailed description thereof, wherein—

Figure 1 is a plan view of an exemplary pallet or platform incorporating the features of the instant invention, Figure 2 is a side elevational view of the pallet shown in Figure 1, Figure 3 is an enlarged partial plan view similar to Figure 1 but with the load supporting flooring broken away in part to show framing details, Figure 4 is an enlarged end elevational view taken along the line 4—4 of Figure 1, the end ramp or apron hinges being shown in section, Figure 5 is an enlarged sectional view taken along the line 5—5 of Figure 1 and showing the details of the hinge and latch mechanisms, Figure 6 is a sectional view taken along the lines 6—6 of Figure 5, with parts added, Figure 7 is a sectional view taken along the line 7—7 of Figure 5 but showing a ramp latched in fully raised or vertical position, and with parts added, Figure 8 is an enlarged partial plan view of a corner of the pallet shown in Figure 1 with parts being broken away to show the cam operator and its connection to the ramp latching mechanism, Figure 9 is a side elevational view of a modified form of pallet including a suitable protective side railing, the ramps being removed for the sake of clarity, Figure 10 is a partial sectional view of the modified pallet shown in Figure 9 and taken along the line 10—10 of Figure 9, Figure 11 is an enlarged side view of the railing catch means as shown incorporated in the railing of Figure 9, Figure 12 is an enlarged side view of the rail catch means shown in Figure 11, and taken along the line 12—12 of Figure 9.

Turning in particular, now, to Figures 1, 2 and 3, it may be seen that the pallet is comprised of three main components, a central generally, though not necessarily, rectangular cargo supporting platform 10 and edge or end connected vertically swingable aprons or ramps 20, which may be locked in a plurality of distinct positions or permitted to swing freely within certain limits as illustrated by the various dotted line outlines incorporated into Figure 2.

Considering the main section or platform 10, it may be seen that it is constructed of a plurality of fabricated structural components. These comprise a plurality of spaced pairs of longitudinally extending and parallel channels 1 and 2. As is apparent from Figure 3, the channels 2 are positioned in back-to-back relation, i.e., the webs face toward each other, while channels or longitudinals 1 face in opposite, or face-to-face relation with respect to each other. Thus, channels 1 are also in face-to-face relation with respect to channels 2.

The longitudinals 2 are interlaced transversely by any desired number of transverse elements preferably similar channels 3. The channels 2, however, are connected to the longitudinals 1 by a series of plate members 4 which may be connected to bottom flanges of the respective channels in such a manner as to be flush with the respective outer surfaces of the flanges.

Surmounting the assembly of components thus far described are a plurality of plank-like members 8 which are preferably metallic and assume the cross-sectional configuration disclosed clearly in Figure 6. Such sections are generally comprised of extruded, light metals such as aluminum, magnesium or the like. These sections have considerable load bearing or strengthening properties which not only support the load or cargo, but lend considerable strength to the fabricated underframe against twisting, bending, misalignment and the like, which might result from rough useage or unfavorable loading conditions or both.

The endmost floor planks for the central member 10 are provided with slots appearing at 33 for a purpose to be hereinafter described. The planks may be welded, as at 32 to the channels 1 and 2 as well as to members 3, and 6.

As is apparent in Figure 1, the planks 8 extend transversely beyond the outermost edges of the longitudinals 1. Thus, the ends of planks 8 are cantilevered and are joined at their edges on both sides by a pair of longitudinally extending angle sections 6 disposed parallel to longitudinals 1 and channels 2. These angles 6 are supported in turn by means of any desired number of diagonally positioned, generally transversely extending angle sections 14 which are welded to both angles 6 and the webs of the longitudinals 1 except near the ends of the platform 10 which construction will be described in detail hereinafter.

Also extending transversely of the longitudinals 1 and 2 are a plurality of pairs of channel members 5. These channels are disposed in face-to-face relation with the webs forming the bottom and top of a generally rectangular tube as seen in Figure 2 which extends transversely of and slightly beyond the marginal edges of the planks 8. Preferably the channels are formed of discontinuous but co-terminus sections, interdigitated between the longitudinals 1 and channels 2. Each of the latter would have an aperture provided in its vertically disposed web such that the tube defined by channels 5 would extend completely unobstructed from one marginal side of platform 10 to the other.

Suitable gussets 5' would be applied at the intersections of longitudinals 1 and channels 2 and tube defining channels 5 to reinforce the joint.

Surrounding channels 5 and also contacting the longitudinals 1 is a reinforcing channel section 7 of relatively short length. This channel section acts to reinforce the longitudinals 1 and has its web spaced outwardly from longitudinals 1. In other words the edges of the flanges of channel section 7 are welded to the back of webs of longitudinals 1. A pair of reinforcing plates 7' may be welded to section 7 as well as tube defining channels 5 as shown clearly in Figure 2. The plates 7' thus reinforce those portions of the tube defining channels 5 which project laterally beyond the longitudinals 1 and, as pointed out, beyond the lateral marginal edges of floor planks 8.

The purpose of the tube defining channels and the face-to-face positioning of the pairs of longitudinals 1 and 2 will now be described. It will be noted that the positioning of these members is such that longitudinals 1 and 2 as well as channels 5 are symmetrically located with respect to the respective longitudinal and transverse center lines of the platform. Also the paired face-to-face longitudinals 1 and 2 define a longitudinal receptacle on either side of the longitudinal centerline of the platform. The width between the centers of the apertures or receptacles defined by the spaced pairs of channels 5, longitudinals 1 and channels 2 is so calculated as to permit the entry of the usual prongs of a fork lift truck. Thus a front loading truck would move into engagement with the platform in such a manner that its prongs would enter the space defined by the respective pairs of face-to-face longitudinals 1 and channels 2. Similarly, a side lift truck would engage the platform through the medium of tube defining channels 5. Thus, the pallet is capable of being carried by either handling vehicle in such a manner as to be transported with its longitudinal axis paralleling the general direction in which it would travel.

Such an arrangement obviously reduces the space requirements for proper handling of the pallet, thus greatly increasing the ease with which, for example, the lift truck operator may maneuver. Also by reason of the symmetrical arrangement of the fork receiving receptacles the platform is naturally balanced about its respective longitudinal and transverse axes thus reducing the danger of resulting damage and inconvenience of inadvertent overturning of the pallet as well as the cargo loaded thereon.

It is quite possible, of course, in some instances that the provision for side lifting might be omitted and the pallet used for end lifting only. In this respect it is to be noted that the greater width between the paired longitudinals 1 and channels 2 is due to the fact that since a greater cantilever load would be supported from the front lift truck due to the rectangular configuration of the pallet, such lift trucks usually incorporate prongs of considerably greater size and width than those applied to a side lift truck. Axiomatically, the receptacles or pallet openings which receive the former type must be wider and in general larger than those utilized in side lifting.

Having considered at least the fundamental construction of the main platform 10 a detailed description of aprons or ramps 20 is now in order. Since each of these ramps is identical in construction a full description of one will suffice for both. Usually two such ramps or aprons 20 are provided, one on each end of the main platform 10 of the pallet.

Each apron or ramp, as is clearly seen in Figure 3, comprises a framework fabricated of laterally spaced and in side appearance, generally wedge-shaped support members 12 and 13. These members may be cut from either a channel-sectioned shape or from an angle having unequal legs whichever is most desirable. The support members 12 are disposed in such a manner that their top surfaces or flanges, as the case may be, all face in the same direction. One of the marginal supports 13, however, has its web or longer leg, as the case may be, arranged in an oppositely facing relation to the support members 12 and the other marginal support 13. Thus, the two members 13 define the outermost or lateral edges of the ramp 10. The shallow end of the wedges, that is, the outermost ends of the apron or ramp supporting framework are connected by a laterally extending angle 9. As is apparent from an inspection of Figure 2, angle 9 includes legs of unequal depth or dimensions and the angle defined by the legs is somewhat less than 90°. With the longer or deeper leg disposed upwardly, this angle is welded into place at the extreme ends of the wedge shaped supports. If desired suitable hand holds 11 are provided adjacent the lateral ends of the angle.

Again, as in the case of main platform 10, extruded metallic floor sections 8 identical with those previously described are welded to the wedge-shaped supports 12 and 13 to define not only a floor but also to reinforce the framework. Thus, there is formed an inclined ramp or apron 20 which has a surface extending between the ground or floor level and the top of main platform 10. Obviously by such an arrangement the loading or unloading of the pallet is greatly facilitated since bulky objects or whatever may be slid or rolled onto the pallet easily and with considerably less expenditure of energy than would be required to lift the same onto the pallet as is usually conventional in the prior devices.

Similarly, the aprons or ramps 20 greatly facilitate unloading by reason of the fact that, in many instances, due to their hereinafter described connection with main platform 10 they may be adjusted vertically to form a dockboard between, for example, the platform 10 and the floor of an aircraft while the pallet is held in raised position by a suitable lift truck. In addition, the ramps may be swung to such a position as to prevent accidental droppage of cargo from the ends of the platform 10.

To this latter end, and particular reference is made to Figures 7 and 8, the wedge shaped members 12 are provided at their widest or platform end with hinge plates or ears 35. These plates or ears are identical; hence a description of one will serve as a disclosure of all such plates or ears 35.

The plates 35 are connected at one end to the cut channel or angle, wedge-shaped members 12 as by welding in such a manner that one plate each projects outwardly toward the main platform 10, beyond the marginal edge of the deep portion of the respective aprons 20 and through the recesses 33 in an end plank 8. The projecting portion of these plates, as may clearly be seen in Figure 7 is generally semi-circular from a point or abutment 41 to a point at which the upper portion 43 meets the semi-circular marginal edge 44. The top 43 of the plate 35 is generally flattened. Disposed at spaced intervals around the semi-circular edge is a plurality of notches 38 and 39 generally rectangular in configuration. These notches along with the notch provided by abutment 41 of the plate 35 formed by discontinuing the semi-circular edge form stop abutments engageable by a suitable latch means 24 to be hereinafter described.

The plates 35 are also provided with a pivot pin aperture 42 located at the approximate center or intersection point of the various radii of the semi-circular portion previously described. The apertures receive connector and pivot pins 18 carried at the ends of the platform 10 in a manner also to be described in detail. Thus, it may be seen that the respective aprons 20 may be swung vertically about pins 18. It is also obvious that by properly positioning the notches 38, 39 and 41 the aprons may be locked in a multiplicity of selected angular positions with respect to platform 10. Thus, notch 38 would act to lock an apron 20 in its uppermost or load retaining position as shown in dotted lines in Figure 2. Notch 39 would serve to lock the ramps or aprons 20 in a normal loading position as shown in Figure 2, while abutment 41 would stop the platform at a position below the intermediate position at a definite angle with respect to the main platform 10, where for example none of the notches are engaged with the latch member 24.

While any suitable number of latched, as well as load retaining positions could easily be provided by the use of more or less notches in hinge plates or ears 35, it has been found preferable to limit the two extreme positions of the ramps to approximately 83° above the horizontal and approximately 25° below the horizontal or in other words allow the aprons or ramps to swing through an arc of approximately 108° between the two specified limits. The intermediate positions of the ramps 20 would be generally vertical as effected by engagement of latch 24 with notch 38 and approximately 3½° below horizontal affected by engagement of latch 24 with notch 39.

Referring now in particular to both Figures 4, 5 and 6, the end structure of platform 10 as well as the latch means which engages plates 35 will be described in detail. Again both ends of platform 10 are identical, hence a description of one will serve as a full description of both. Extreme ends of longitudinals 1 are reinforced by relatively short channel members 15 which have their flanges welded to the back or webs of longitudinals 1. Thus, a space is effected between the webs of angles 15 and longitudinals 1, which space is sufficient to receive the hinge plates or ears 35 fixed to aprons or ramps 20. A portion of the top horizontal flanges of the channels 15 is removed or cut-away such that a slot 33' is formed between channel member 15 and longitudinal 1. This slot 33' permits hinge plates 35 to project upwardly as is apparent in Figures 2 and 4. Also, each slot 33' is in alignment with a slot 33 defined by a cutout in the end floor planks 8 of platform 10 as previously described and for reasons now obvious.

The vertically disposed webs of longitudinals 1 may be reinforced by suitable plates 16 and 17 which are apertured at 16' and 17' along with the vertical web of longitudinal 1 to receive pin 18 in horizontally disposed transverse relation with respect to slots 33 and 33'.

A similar construction is effected at the ends of channels 2 with but one exception, that is that the second slot defining channel member 28 is disposed in back-to-back relation with respect to a channel 2 and is welded as indicated particularly in Figure 1 to a transverse channel 34 which extends transversely of and is welded to the pair of symmetrical channels 2, 2, member 28 also having slots 33'.

Again channel member 2 is apertured to receive a pivot pin 18 as is clearly shown in Figure 3 and further suitable reinforcing plates 29 and 31 are welded to the vertical web of each channel 2.

Thus, a plurality of strong yet relatively easily fabricated pivotal connections are effected between aprons or ramps 20 and the main cargo supporting platform 10.

It is to be noted, also, that hinge pins 18 are headed on one end and apertured diametrically on the other such that upon application of a suitable large washer having an outside diameter greater than apertures 16', 17', etc., and a cotter pin 21, they may be locked in fixed but removable position in platform 10 to prevent accidental dislodgement thereof and consequential separation of ramps 20 and platform 10.

In order to latch the aprons 20 in their various positions a spring-biased, manually operable latching mechanism is applied to platform 10. As may be seen from an inspection of Figures 5, 6 and 8, a plurality of blocklike members 24 appropriately spaced, extend across the slots 33. These blocks 24 are carried by an elongated rectangular latch bar 23 movable longitudinally of its length and extending transversely across the ends of platform 10. In other words the bar 23 along with blocks 24 is shiftable into and out of locking engagement with the notches of the ears of the ramp along a plane generally parallel to the pivotal axis of the ramp. The bar 23 slides laterally of and in suitable rectangular apertures provided in longitudinals 1 and 2 as well as channel members 28 and 15 along with reinforcing plates 16, 17, 29 and 31. The plates 16, 17 as well as channel 28 and longitudinals 1 are also apertures as to permit passage laterally therethrough of latch blocks 24.

The latch bar 23 is manually operated to unlock the hinge plates or ears 35 by a cam-type lever 36, shown clearly in Figure 8, having a handle and a cam face 37, eccentric with respect to pin 36' which connects bar 23 to handle 36. The cam surface 37 rests against the vertical surface of a suitable angle like member 49 welded to side framing angles 6 and the reinforcing channel 15 as clearly shown in Figure 3. It will be appreciated that the handle 36 and angle 49 are disposed at the opposite end of the platform as shown in Figure 1 from the end through which the line 3—3 and thus Figure 3 is shown in detail. In other words the actuation handles are located on diagonally opposite corners of the load carrying platform 10.

Thus, due to the eccentric connection between the cam handle 36 and latch bar 23 it may be seen that as the handle is moved to one position the distance from pin connection 36' and the vertical leg angle 49 is greater than it would be in the opposite position. Thus, latch bar 23 would be caused to move laterally and in doing so would carry the latch or keeper blocks 24 transversely out of slots 33 and hence out of engagement with the hinge ears or plates 35. In the opposite position the distance between the pin connection 36' and the vertical leg of angle 49 is lessened and hence latch bar 23 will move in the opposite direction to dispose keepers or latch blocks 24 in the slots 33 and hence in engagement with the notches in hinge plate 35.

In order to keep the cam surface 37 of handle 36 in firm contact with the angle 49 and also to bias the latch bar as well as the blocks or keepers 24 in notch engaging position a suitable spring biasing means is provided. As seen in Figures 5 and 6, a horizontal downwardly faced channel 22 is welded to the vertical web of longitudinals 1 and channels 2. Within this channel 22 is welded a vertically disposed plate 26 which also may be welded to the bottom flange of channel 2 as shown. This plate 26, as clearly shown in Figure 5, is apertured to receive a horizontally disposed and, as shown, laterally movable rod section 48. Rod section 48 is in turn parallel with and connected to the latch bar 23 by suitable strap members 25, which are rigidly fixed by pin or other connections to both elements. A compression spring 27 surrounds the rod section 48 and has one end in abutment with plate 26 and the other end in abutment with strap 25. Thus, as the bar 23 is moved to the left as shown in Figure 1 by actuation of handle or lever 36 in the manner previously described the spring 27 is compressed between fixed plate 26 and the laterally movable straps 25 as shown in Figure 3. Thus so long as the greater distance is maintained between pin connection 36' and angle 49 the keeper or latch blocks 24 are out of engagement with notches 38 and 39 as previously described.

Thus, apron 20 would fall below the horizontal until protuberance or lug 41 of hinge plate 35 contacts the latch bar 23. Also when apron 20 is to be raised the handle 36 is actuated to provide the shortest distance between pin connection 36 and angle 49 and thus the latch or keeper block will tend to move across recess 33 and will so do with a snap action as soon as notch 39, for example, is properly registered therewith.

The cam handle surface 37 is so contoured as shown to move to two overcenter positions, full lock or full release, and may be further actuated so as to just release the locking block or keeper 24 from any of the notches in hinge plate 35 and upon release the lever will be still spring biased to return to latched position.

It will be appreciated that two such arrangements are provided, one on each end of main platform 10 for the respective aprons 20. It will be appreciated that a lock block or keeper 24 is provided for each slot 33 and that all carried on one of the latching bars 23 are movable simultaneously. Thus a reliable simple and strong latching means is provided for locking the aprons 20 in any of their various multiple positions with respect to the load bearing platform 10.

In Figure 9 there is disclosed a side view of a portion of a modified pallet substantially identical to that disclosed in Figure 1 but with the ramps or aprons removed for clarity only, and incorporating side confining safety railing designated generally at 50.

In its simplest form the basic pallet as shown in Figures 1, 2, etc., is modified only to the extent that the side marginal angles 6, having legs of equal length are replaced by angles 6' having unequal legs, the longer of which is disposed vertically.

To this longer or deeper leg 6' are fixed a plurality of post anchors 51 which for simplification, may comprise short lengths cut from a hat-sectioned extruded member. These lengths are bolted or otherwise fixed to side members 6' to define opened bottomed pockets into which vertical stanchions 52, 52' having a slightly tapered end may be inserted as clearly shown in Figure 10. As is obvious stanchions 52 and 52' are horizontally spaced and terminate at their tops in suitable hardware 53, 54 which support and swingably fix a plurality of rail members 55 parallel to the load supporting surface as defined by planks 8.

Some of the stanchions are capped with hinge defining members which may comprise a stanchion receiving and engaging frame having spaced apertured ears between which a rail 55 is pin connected for vertical swinging movement. Such an arrangement is more or less conventional in the art.

Thus, the free ends of rails 55 swing in opposite directions and hence these same free ends would be in coterminous abutting relation at a given post 52'. To securely fix the rails 55 to the post there is provided a novel gravity operated latch means 54, disclosed in Figures 11 and 12 in particular.

The latch 54 basically comprises a U-shaped saddle fixed to the top of post 52'. The saddle, as shown in Figures 11 and 12, comprises a bottom 58 and spaced vertical walls 56 and 57. These are parallel with respect to each other and also to the rails 55. Of the vertical walls 56 is considerably higher than wall 57 and carries at its top a trunnion 59 which is adapted to receive a pin 61 having its axis also parallel to rails 55. To the pin is swingably connected a keeper 63 which extends through a slot in wall 56 and across a greater part of the space between walls 56, and 57. The keeper 63 also is provided with ears 62 which engage wall 56 on the side opposite to that through which the keeper extends and also acts by weight to keep the keeper 63 in locking position. Thus, rails 55 as shown in Figure 12 are locked in saddle 54 by keeper 63. It is also obvious that manual actuation is necessary to release rails 55 while the weight of the rails in moving into contact with the saddle will dislodge the keeper 63 until the rails are seated in saddle 54 at which time the weight of keeper 63 and ears 62 will cause it to lock rails 55 in place.

Obviously, all posts or stanchions are readily removable for loading and constitute a readily removable yet readily accessible safety rail which would prevent accidental spillage of cargo carried on the pallet as well as protect personnel who might of necessity be on the lifted pallet.

Where possible all structural components are of light metal sections and all joints and connections are welded.

Thus, it may be seen that there is provided a cargo storage and loading pallet which is rugged, light, yet capable of handling heavy loads, is handled by various equipment and which may be loaded or unloaded with greater facility than such pallets as have been in use heretofore.

The end aprons or ramps provided for easy loading since cargo may be slid rather than lifted onto the central or load carrying platform 10. Further, during unloading these aprons may be dropped to act as dockboards or the like serving to bridge uneven levels which might exist between a vehicle to be loaded and the pallet thus eliminating unnecessary maneuvering and jockeying of the palletized cargo by the lift truck operator.

Also, should the pallet 10 be loaded on uneven ground surface the aprons may be dropped to their lower limits and thus serve to bridge the space between the ground level and the pallet level.

Having thus described a specific pallet capable of performing the objects of the invention, it is to be noted that variations may be made in the specific construction thereof while incorporating the basic features of the disclosed invention, which is limited only to the extent as indicated in the appended claims, wherein what is claimed is:

1. In combination with a load-supporting platform for use with lift trucks at least one vertically swingable loading and unloading ramp having ears provided with a plurality of spaced notches and pivotally connecting said ramp to an edge of said platform, and means for selectively locking said ramp in any one of a plurality of selectable positions with respect to said platform, said means including a slidable bar means shiftable along a plane generally parallel to the pivotal axis of said ramp and into and out of locking engagement with a given one of said notches in the ears of the ramp.

2. In combination with a load-supporting platform a vertically swingable loading and unloading ramp as set forth in claim 1 and resilient means for biasing said slidable bar means during the locking engagement thereof with a given one of said notches.

3. In combination with a load-supporting platform for use with lift trucks a vertically swingable loading and unloading ramp as set forth in claim 1 and cam means for actuating said slidable bar means.

4. In combination with a load-supporting platform for use with lift trucks a vertically swingable loading and unloading ramp as set forth in claim 1 wherein said platform has a plurality of pairs of receptacle means within which the forks of a fork lift truck are selectively insertable, one pair of receptacle means being disposed at an angle with respect to another pair of receptacle means.

5. In combination with a load-supporting platform for use with lift trucks at least one vertically swingable loading and unloading ramp having ears provided with a plurality of spaced notches and pivotally connecting said ramp to an edge of said platform, means for selectively locking said ramp in any one of a plurality of selectable positions with respect to said platform, said means including a slidable bar means shiftable along a plane generally parallel to the pivotal axis of said ramp and into and out of locking engagement with a given one of said notches in the ears of said ramp and said platform also being provided with at least one pair of spaced receptacle means within which the forks of a fork lift truck are insertable.

References Cited in the file of this patent

UNITED STATES PATENTS

| | | |
|---|---|---|
| 271,730 | Morrison | Feb. 6, 1883 |
| 358,461 | Lee | Mar. 1, 1887 |
| 797,871 | Smith | Aug. 22, 1905 |
| 1,188,839 | Schell | June 27, 1916 |
| 1,603,409 | Rickenbacher | Oct. 19, 1926 |
| 1,658,408 | Lathrop | Feb. 7, 1928 |
| 1,736,172 | Raymond | Nov. 19, 1929 |
| 1,832,772 | Hallowell et al. | Nov. 17, 1931 |
| 2,049,620 | Reed et al. | Aug. 4, 1936 |
| 2,503,562 | Porter | Apr. 11, 1950 |
| 2,579,655 | Donald | Dec. 25, 1951 |
| 2,594,533 | Baker | Apr. 29, 1952 |